Jan. 15, 1957 T. C. SCHENK 2,777,264
APPARATUS FOR ASSEMBLING AND PACKAGING AN EDIBLE
Filed July 11, 1952 7 Sheets-Sheet 1

INVENTOR.
Tamis C. Schenk
BY W. Lee Helms

ATTORNEY

Jan. 15, 1957 T. C. SCHENK 2,777,264
APPARATUS FOR ASSEMBLING AND PACKAGING AN EDIBLE
Filed July 11, 1952 7 Sheets-Sheet 2

INVENTOR.
Tamis C. Schenk
BY
ATTORNEY

Jan. 15, 1957 T. C. SCHENK 2,777,264
APPARATUS FOR ASSEMBLING AND PACKAGING AN EDIBLE
Filed July 11, 1952 7 Sheets-Sheet 3

INVENTOR.
Tamis C. Schenk
BY W. Lee Helms
ATTORNEY

Jan. 15, 1957 T. C. SCHENK 2,777,264
APPARATUS FOR ASSEMBLING AND PACKAGING AN EDIBLE
Filed July 11, 1952 7 Sheets-Sheet 4

INVENTOR.
Tamis C. Schenk
BY W. Lee Helms
ATTORNEY

Jan. 15, 1957  T. C. SCHENK  2,777,264
APPARATUS FOR ASSEMBLING AND PACKAGING AN EDIBLE
Filed July 11, 1952  7 Sheets-Sheet 5

INVENTOR.
Tamis C. Schenk
BY W. Lee Helms

ATTORNEY

Jan. 15, 1957 T. C. SCHENK 2,777,264
APPARATUS FOR ASSEMBLING AND PACKAGING AN EDIBLE
Filed July 11, 1952 7 Sheets-Sheet 6

INVENTOR.
Tamis C. Schenk
BY W. Lee Kelms
ATTORNEY

United States Patent Office 2,777,264
Patented Jan. 15, 1957

2,777,264

APPARATUS FOR ASSEMBLING AND PACKAGING AN EDIBLE

Tamis C. Schenk, Richmond Hill, N. Y., assignor to Le Roy Food Products, Inc., Brooklyn, N. Y., a corporation of New York Application July 11, 1952, Serial No. 298,300

4 Claims. (Cl. 53—154)

This invention relates to an apparatus adapted to assemble a bag, an insert liner, and a pair of cookies and to package said cookies in spaced apart relationship on said liner in said bag.

It is an object of this invention to provide a machine for automatically forming and assembling paper liner inserts adapted to receive and retain a pair of edible cookies in spaced relationship, said assembled package being adapted to receive an ice cream filling or the like to make a composite article of manufacture known as an ice cream sandwich.

It is another object of this invention to provide a packaging machine adapted to form a packaged ice cream sandwich without an ice cream filling and wherein the package parts are brought into relationship with one another and assembled together with the cookies forming the sides of a sandwich, said machine having means for delivering cookies in parallel relationship on the opposite sides of a press plunger, said plunger being adapted to force the cookies and a liner therefor into an opened bag.

It is another object of this invention to provide a vacuum operated bag opener to open flat wall folded bags.

It is a further object of this invention to provide a mechanical auxiliary bag opener adapted to straighten out the end folds of a bag opened by vacuum means.

It is another object of this invention to provide vacuum suction means for displacing the front wall of a bag away from a rear wall.

It is a further object of this invention to provide means for pulling a paper tape past forming means, said forming means being adapted to cut and form a shaped liner adapted to receive a pair of cookies in a spaced-apart relationship.

Still another object of this invention is to provide a novel means of activating a plurality of diverse mechanical parts all from a common power source and all in timed relation with one another.

These and other objects of this invention will become readily apparent upon reading the following descriptive disclosure taken in conjunction with the accompanying drawing in which.

This invention is an improvement of the invention subject to Pat. No. 2,616,233 in the name of Tamis C. Schenk.

Figure 1:
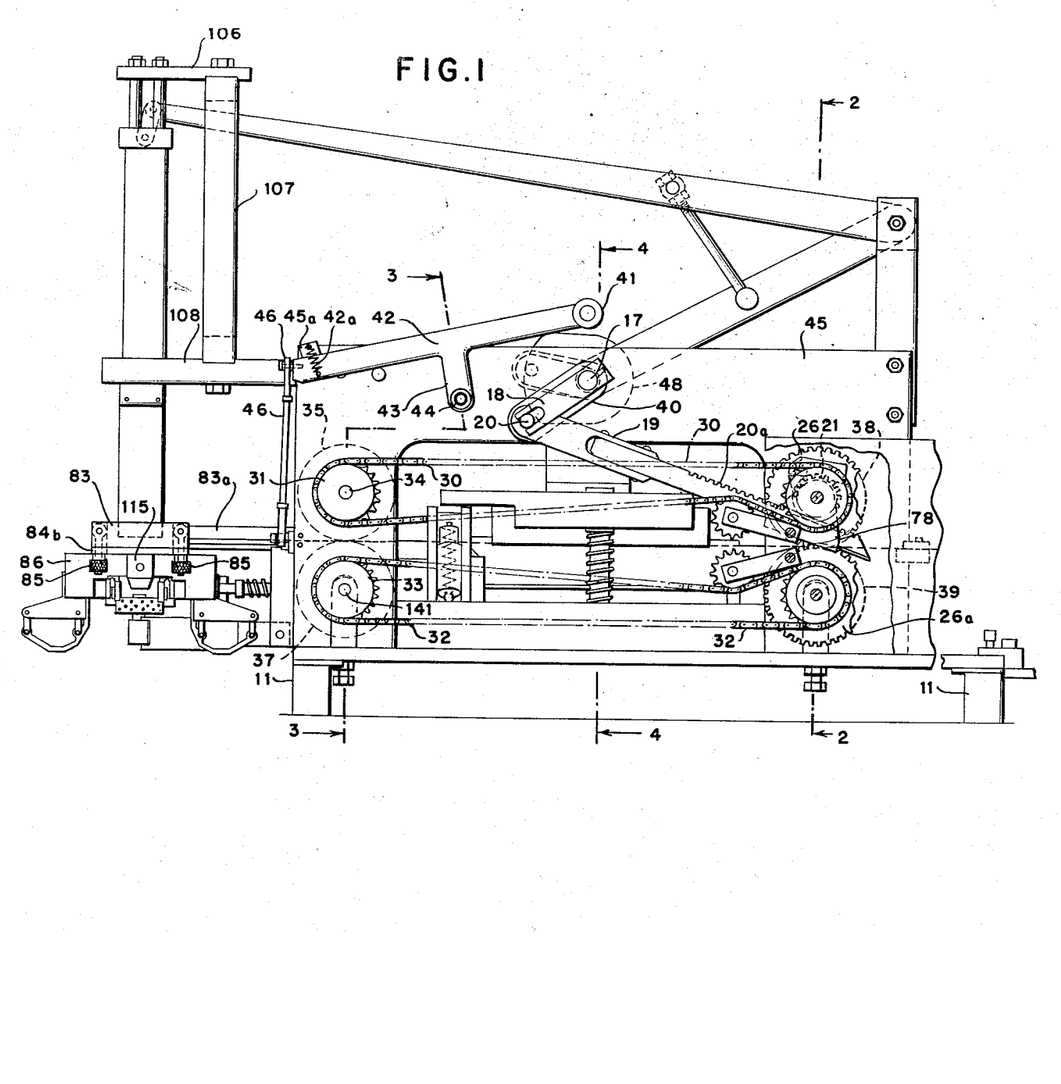
Fig. 1 is a side elevation broken away in part to show the means for activating the mechanism used to form an insert liner adapted to retain cookies in spaced apart relationship.

Referring to the figures, a base support 10 composed of a plurality of channel iron frame members 11, supports an electrical motor 12 by means of a motor support 13, and a speed reducer support 14 which in turn supports a speed reducer 15. The power output of the speed reducer 15 is directed to drive the apparatus of this invention through axle 17. Axle 17 is provided with a crank arm 18 keyed to the shaft 17. Crank arm 18 has a U-shaped opening at its outer end disposed away from shaft 17 (Fig. 1). A ratchet arm 19 is provided with a peg 20, said peg 20 being disposed in the U-shaped opening of arm 18. The lower portion of ratchet arm 19 (Fig. 2) is provided with gear teeth 20a, adapted to operate a gear 21, said gear 21 rides freely on axle 79 and has an integral projecting collar 22. The collar 22 has a varying radius, thereby producing a step-down shoulder 23 adapted to engage a pivoted ratchet 24 (Fig. 5) journaled in a housing 25 and secured to gear 26. The housing 25 has a spring 27 therein adapted to force ratchet 24 in engagement with the outer periphery of projection 22. Gear 26 is keyed to shaft 79, which shaft is keyed to cutter 38. Gear 26 also engages gear 26a, which is keyed to shaft 29a. Gear 26a drives the cutter companion wheel 39.

Rotation of gear projection 22 causes the shoulder 23 to engage the point 28 of ratchet 24 to cause intermittent rotation of gears 26 and 26a and thus of cutter 38 and wheel 39. Rotation of gear 26 causes rotation of the gear 26a disposed beneath said gear 26, thereby causing simultaneous rotation of shaft 79 and 79a. A sprocket chain 30 is adapted to rotate a front gear 31, and a sprocket chain 32 is adapted to rotate a front gear 33. Gear 31 is journaled to a shaft 34 which in turn is journaled to a propelling wheel 35, and gear 33 is journaled to a shaft 141 which in turn is journaled to a propelling wheel 37. Sprocket chains 30 and 32 respectively engage drive gears 29 and 36 which gears are keyed to shafts 79 and 79a. The propelling wheels 35 and 37 have narrow outside peripheries (Fig. 3) adapted to engage a paper strip 71 between said peripheries and tape guides 113 and 113a and propel the engaged paper forward through the machine. The paper strip 71 is pulled between cutter wheel 38 and a companion wheel 39 disposed toward the rear of the machine (Fig. 1).

Figures 2, 3, 4, 5, 6, 7:
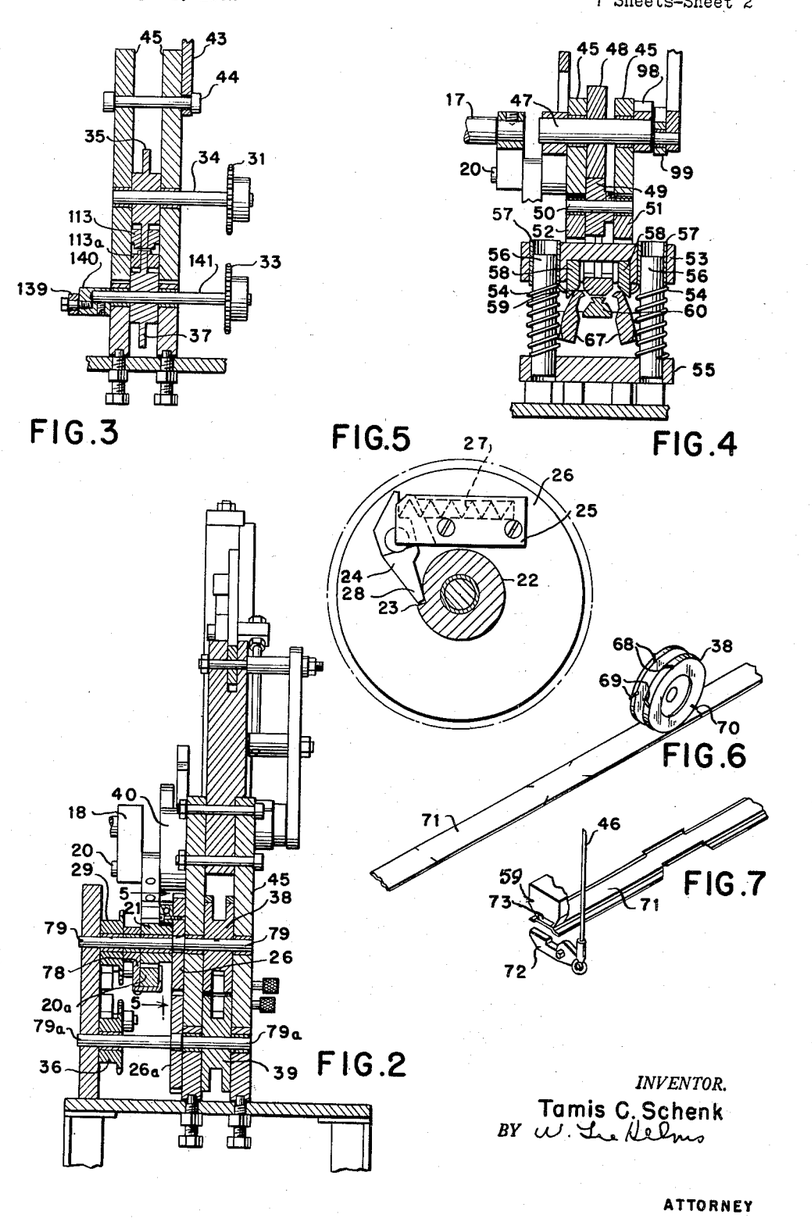
Fig. 2 is a sectional view taken on line 2—2 of Fig. 1 showing the means for intermittently activating the liner cutters.
Fig. 3 is a sectional view taken on line 3—3 of Fig. 1 and showing the front end means for pulling the paper tape past the forming dies.
Fig. 4 is a sectional view taken on line 4—4 of Fig. 1 and showing the means for inserting cookie retaining creases in the paper liner.
Fig. 5 is a view of the ratchet means, partly in section, used for intermittently activating the liner forming mechanism.
Fig. 6 is a schematic view showing the manner of cutting the paper tape with a double-rimmed wheel having cutters spaced about its periphery.
Fig. 7 is a view of the device used for severing the formed tape to produce individual insert liners.
Figure 8:
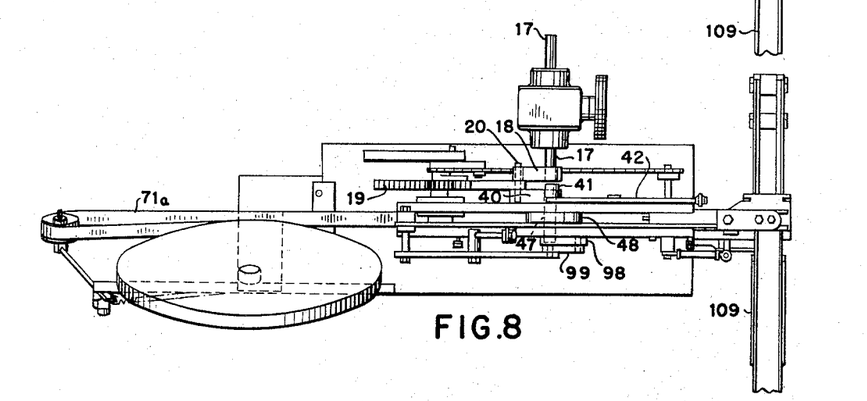
Fig. 8 is a top plan view showing the means for activating the various movable parts of the apparatus.

The peg 20 extends through the ratchet arm 19 into a spoke 40 (Figs. 1 and 8). A roller wheel 41 (Fig. 1) is disposed on a T-shaped bar 42, the short depending member 43 of the T-shaped bar being pivotally journaled at 44 through one of the parallel superstructure frames 45. Roller wheel 41 is adapted to be engaged by the exterior surface of the spoke 40 on rotation of said spoke 40, thereby activating the cutter bar 46 to sever a prepared liner insert of the tape 71 (Fig. 7). Spoke 40 is keyed into an axle 47. A cam 48 is also keyed to said axle 47. Since peg 20 is permanently fixed to spoke 40, its position in the U-shaped opening of crank arm 18 is fixed, so that rotation of arm 18 necessarily rotates spoke 40 and the shaft 47 keyed thereto.

The cam 48 (Fig. 4) rides upon rotatable wheel 49 journaled to axle 50, thereby causing the wheel 49, axle 50, and journaled side supports 51 and 52 to be pressed downwardly as a unit when the maximum radius of the cam is in a depending vertical plane. A top plate 53 is supported upon a pair of compression springs 54 secured to a base plate 55. The compression springs 54 ride on cylindrical rods 56, said rods being disposed in apertures in the plates 53 and 55. The apertures of the base plate 53 are provided with bearings 57 to provide for sliding contact between the inner surfaces of bearings 57 and the rods 56, since the top plate 53 is moved downwardly due to the action of cam 48.

Figure 14:
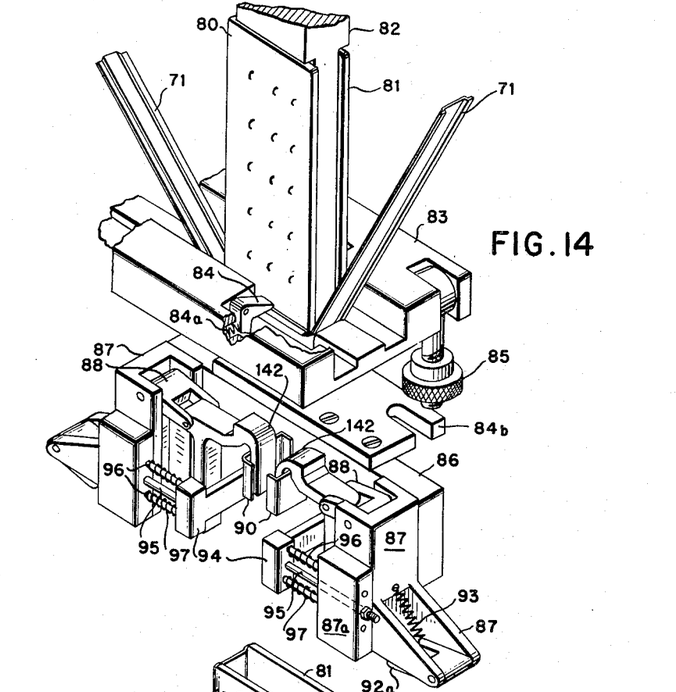
Fig. 14 is an isometric view showing the manner of inserting parallel disposed cookies upon a severed insert liner and further showing the parts of the mechanical bag opener.

The top support 53 is provided with a pair of oppositely disposed wear plates 58 having oblique inwardly disposed depending angles. The frame members 45 support a tape guide 59. A bottom tape guide 60, having a top shaped like a keystone, is disposed beneath the upper tape guide 59. A pair of oppositely disposed inwardly swingable clamps 67, provided with pointed heads, are adapted to swing inwardly so that the points of the clamps 67 engage the inwardly disposed sides of the keystone of guide 60, thereby forming an edge crease in tape 71. As shown in Fig. 2, the cutter wheel 38 is disposed over its companion wheel 39. This cutter wheel 38 is provided with two outwardly disposed and spaced apart rims. A pair of inwardly disposed cutter bars 68 are located on the rims of said cutter wheel 38. Said cutter wheel 38 also is provided with a pair of outwardly disposed cutter bars 69, in spaced relation to said cutter bars 68. Also a pair of oppositely disposed linear cutter bars 70 are located on the rims of said cutter wheel 38. The paper tape 71 is pulled beneath the cutter bar 38 in rolling contact with companion bar 39 by wheels 35 and 37. The paper tape 71, after traversing the cutter bar 38, is provided with edge cuts (Fig. 6) so that the cut paper tape will be adapted to assume a U-shaped form in the ultimate package commodity upon being depressed by plunger 82 (Fig. 14).

The cut tape (Fig. 6) next is pulled between the upper guide 59 and the lower guide 60 with its keystone configuration. The paper disposed between the said guides 59 and 60 is crimped along both of its edges to give the cookie retaining configuration shown in Fig. 14. This crimping action is effected by cam 48 forcing the roller 49 along with its axle 50 and the base 53 downward, thereby causing the oblique surfaces of oppositely disposed wear plates 58 to ride upon the top surfaces of inwardly swingable clamps 67. Clamps 67 are so disposed that the upper points thereof are wedged or squeezed into the inwardly disposed angle formed by the keystone shape of lower tape guide 60.

The paper strip 71, after being cut and crimped into shape, is next cut by means of a cutter bar 46 which activates a swingable cutter plate 72. Cutter bar 46 is held retracted by spring 42a which is secured to stop block 45a. The cutter plate 72 is moved toward a hold down block 73, which holds the crimped tape 71 firmly, so that the tape may be transversely severed by blade 72 moving upwardly toward block 73 (Fig. 7).

The plain tape 71a is stored and unwound from a roll 74, said tape being held in a tensioned state by means of a tension bar 75 having a roller 76 thereon (Fig. 8). The tension bar 75 is tensioned by a spring 77 thereby providing a suitable tension to the tape 71a for efficient operation of the machine. As shown in Fig. 2, the lower end of ratchet frame 19 rides in a yoke 78, which yoke is freely swingable on axle 79. The axle 79 is keyed to cutter wheel 38 and also to gear wheel 26, thereby providing for intermittent rotation of the cutter mechanism 38.

An important feature of this invention is the means for opening a folded paper bag. This means of opening the paper bag for insertion of spaced apart edible wafers and a retaining liner is shown in detail in Figs. 11–16 inclusive.

As shown in Fig. 14, a pair of edible crackers 80 and 81 are disposed on opposite sides of a plunger 82. The crimped tape 71 is propelled underneath the plunger 82 by wheels 35 and 37 before being severed by blade 72, so that the center section of the severed tape, which forms the bottom of the U-shaped liner, is disposed directly beneath the plunger. A support base 83 is secured to the base support 10 by frame member 83a. Support base 83 has an aperture therein adapted to receive a folded U-shaped liner along with a plunger 82 holding spaced apart cookies 80 and 81. The support 83 is also provided with a pair of support fingers 84 on each side of the aperture therein, which support fingers coacting with compressed spring 84a hold the cookies in place against the force of gravity until the plunger 82 is moved downward through the aperture provided in plate 83.

A plate 84b is provided with a pair of slots and is secured to plate 83 by means of a pair of swingable clamps 85 (Fig. 1). Secured to plate 84b is a plate 86. A housing 87 having a U-shaped portion and a projecting angular portion, is provided with pivoted U-shaped lever arms 88. The lever arms 88 are united to mechanical fingers 89, said mechanical fingers having a forward depending end provided with channel bars 90, and a curved rearwardly disposed extension 91.

Figure 13:
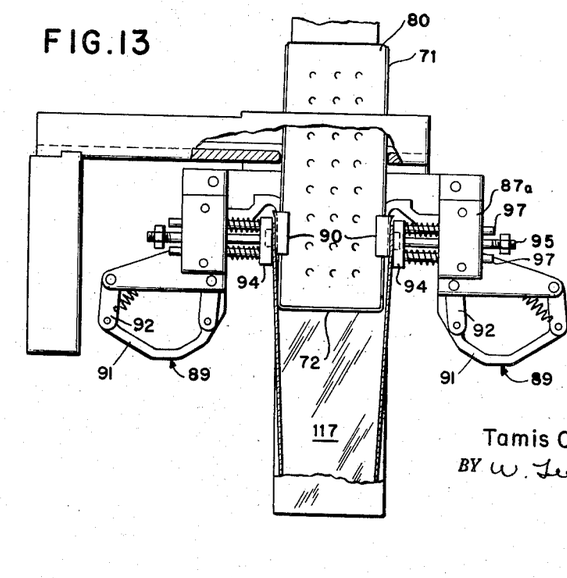
Fig. 13 is a side view showing the manner of inserting cookies disposed on a liner and adjacent a plunger into an opened bag.

A second pair of U-shaped levers 92 unites the middle section of extension 91 to a bottom section of housing 87. A third pair of U-shaped levers 92a unites the end of extension 91 to the angular portion of housing 87. A spring 93 connects said third pair of levers 92a to an inwardly disposed section of housing 87 as shown in Fig. 14. A pair of pressure arms 94 are secured to the housing 87 by guide bolts 95. The pressure arms 94 are urged away from the housing 87 by a pair of springs 96 associated with each feeler arm, and rods 97 upon which the springs 96 ride. The rods 97 and bolt 95 are pushed through apertures provided therefor in sub-housing 87a, secured to housing 87 (Fig. 13).

The plunger 82 is given a reciprocal up and down movement by means of a linkage arrangement co-acting with levers all activated from axle 47 (Fig. 8). A linkage arm 98 activates a companion linkage arm 99 through a bolt 99a, so that a throw radius equal to twice the length of said linkage arms 98 and 99 is obtainable on rotation of axle 47. The linkage 99 is secured to a lever arm 100 at its forward end. The rear end of lever 100 is secured to a frame member 101 secured to structure 45. A second lever arm 102 is also secured to said frame member 101, the lever arms 100 and 102 having a common pivot in said frame member 101. An adjustable connecting rod 103 unites lever arms 100 and 102. The lever arm 102 in turn is pivoted to a link 104, said link 104 being secured to the plunger 82. The plunger 82 has a pair of longitudinal bore holes disposed therein to receive a pair of rods 105. The rods 105 are secured to a plate 106, which plate in turn is secured to a vertically disposed plate 107. Plate 107 is secured to frame members 108 which in turn are secured to the superstructure 45.

The cookies 80 and 81 are disposed on both sides of the plunger by cookie retaining chutes 109 which slope downwardly toward the plunger, thereby providing a gravity feed of cookies to the plunger 82. As shown in Fig. 14, the lower end of plunger 82 is recessed to receive the cookies 80 and 81, the said cookies having a transverse length slightly larger than the transverse length of plunger 82, thereby providing surface areas to receive the inwardly crimped paper of insert 71.

Figure 10:
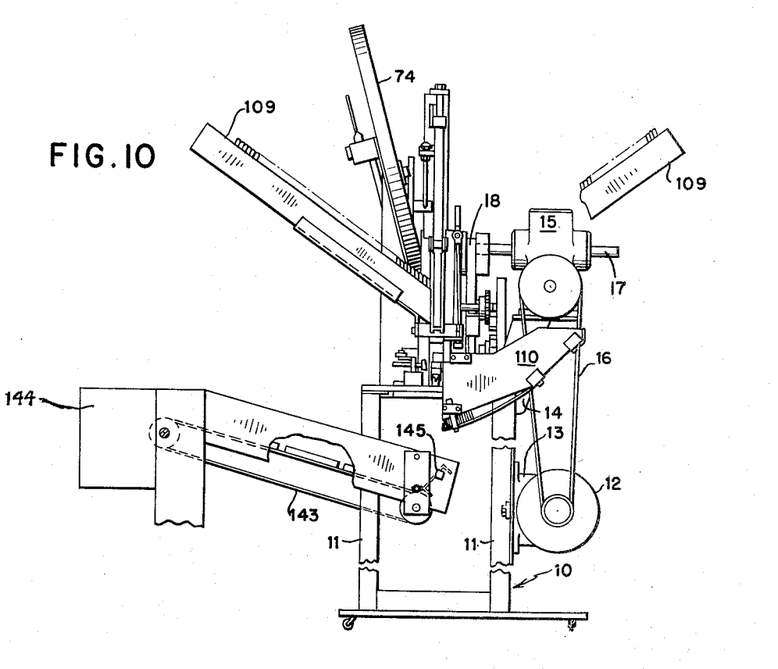
Fig. 10 is a front view of the apparatus showing the means for feeding cookies toward both sides of a plunger, the means for feeding bags adjacent said plunger, and the conveyer means for removing the assembled bags.
Figure 17:
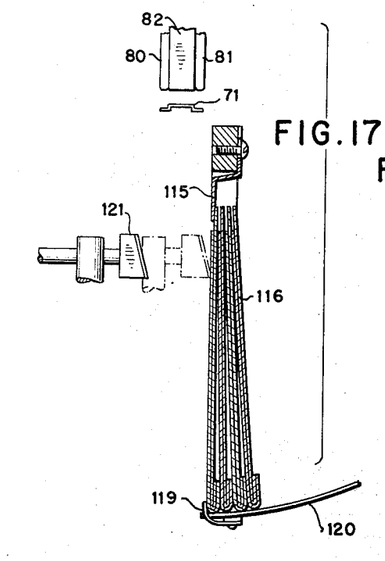
Fig. 17 is a schematic view, partly in section, showing the vacuum means used for opening flat folded bags.
Figure 18:
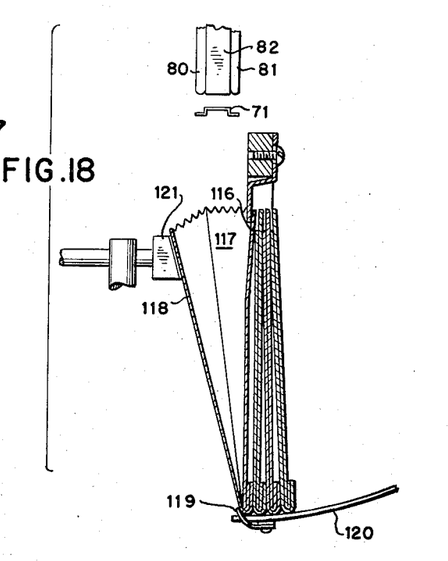
Fig. 18 is a schematic view, partly in section, showing the vacuum means during the process of opening the bag.
Figure 20:
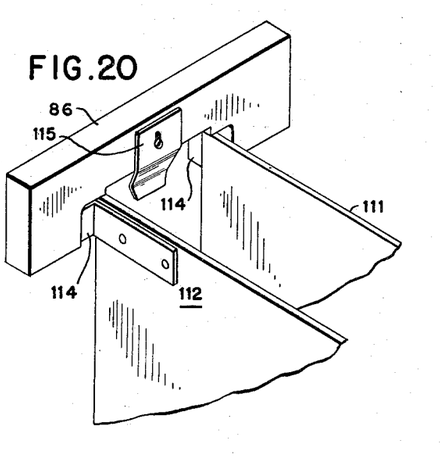
Fig. 20 is a view, partially broken away, and showing the catch means for retaining partly opened bags.

Disposed to one side of the plunger is a bag retaining chute 110 having side walls 111 and 112 (Figs. 10 and 20). The front of the bag retaining chute is held in place by support 86 and angle irons 114 thereby securing the chute side walls 111 and 112. An adjustable bag retainer clip 115 is secured to the support 86 and is adapted to retain the rear wall 116 of the folded bags 117 as shown in Figs. 17 and 18. The front wall 118 of the bags 117 is shorter than the rear wall 116, and since the rear wall 116 is retained by bag retainer clip 115 in co-action with a bottom bag retainer clip 119 secured to the bottom bag chute wall 120, it is therefore apparent that the front wall 118 can be pivotally hinged outward in bellows fashion from the rear wall 116, since the bags 117 are of the folded or fluted type.

Figures 15, 16:
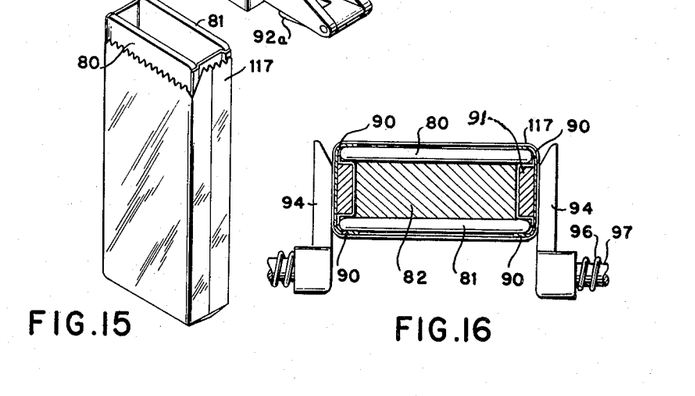
Fig. 15 is a view of the assembled food package containing parallel disposed cookies on a liner, all within an opened bag.
Fig. 16 is a sectional view of an assembled food package showing the mechanical fingers and plunger in cross section, said food package being held outwardly by oppositely disposed mechanical holding fingers.
Figure 19:
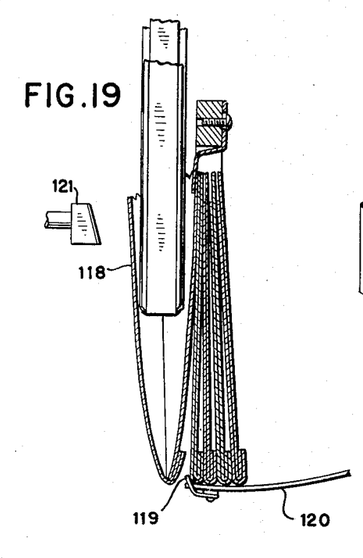
Fig. 19 is a schematic view, partly in section, showing the plunger having oppositely disposed cookies and an insert liner thereon, said plunger being disposed within an opened bag.

To assist the outward movement of front wall 118, a rectangular vacuum cup 121 having a sloping or oblique face with a plurality of apertures therein is disposed opposite said front wall 118. The oblique face of vacuum cup 121 has an angle, as shown in Fig. 18, such that intimate contact between the oblique face and the outwardly disposed front wall is maintained until the plunger 82 with its cookies 80 and 81 and liner 71 are inserted into the opened bag with its outwardly held front wall. After the plunger has entered the bag, as shown in Fig. 19, the vacuum is released and element 121 then disengages its grasp on front wall 118. After release of the vacuum grip, the bag is mechanically held from falling by the grasping action of fingers 94 with elements 90 as shown in Fig. 16, the bottom of the bag having been released from engagement with clip 119.

Figure 9:
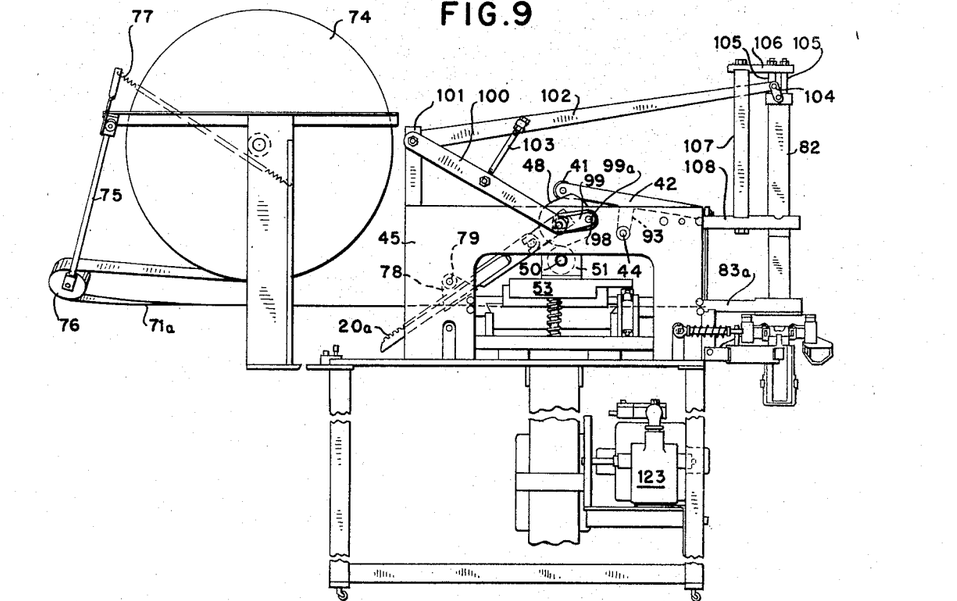
Fig. 9 is a side elevation view, broken away in part, of the apparatus and showing the mechanical means and vacuum means used for opening a folded bag.
Figure 11:
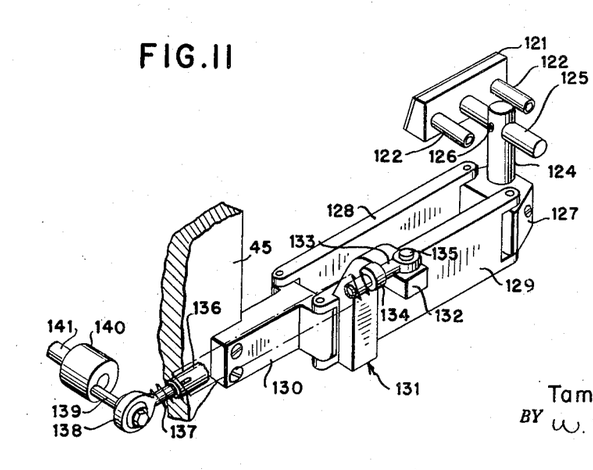
Fig. 11 is a detailed view, broken away in part, of the vacuum means used for opening a closed folded bag.
Figure 12:
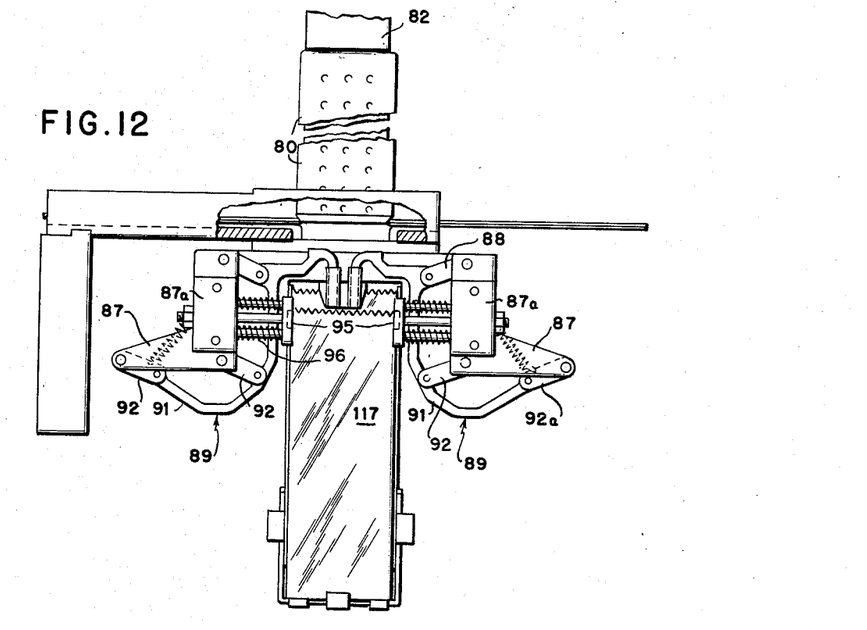
Fig. 12 is a side view, broken away in part, of a pair of opposed mechanical fingers used for straightening out the end walls of a partly opened bag.

As shown in Fig. 11, the vacuum cup 121 is provided with tubular nozzles 122 which connect to a vacuum pump 123 (Fig. 9). The vacuum cup 121 is adjustably secured to a post 124 by means of a cylindrical rod 125 and a set screw 126. The post 124 is secured to a swingable block 127. The block 127 in turn is pivotally secured by means of parallel plates 128 and 129 to a rear T-shaped element 130. Element 130 is in turn secured to a superstructure frame member 45. The plate 129 is provided with an elbow 131 having a horizontal portion 132. Secured to the top of the horizontal portion 132 is a pivoted tubular rod 133 having a collar 134. The rod 133 is pivoted to element 132 through an axle 135. A spring 136 is disposed about the tubuluar rod 133. A cylindrical rod 137 is disposed within the tubular rod 133. Said cylindrical rod 137 is provided with an expanded shoulder 138 which shoulder is secured to a rod 139. Rod 139 in turn is secured to cylindrical drum 140 in radial spaced relationship to the center of said drum 140. The drum 140 is in turn secured to a rotatable rod 141.

The vacuum assembly shown in Fig. 11 is swingable toward and away from the front bag wall 118 due to the motion of elements 128 and 129 co-acting with elements 127 and 133. The operation of swinging the element shown in Fig. 11 toward the bag is timed through rotatable elements 140 and 141 so that the vacuum cup is made to approach the front wall 118 of the bag when the plunger 82 begins to descend. The outward movement of vacuum cup 121 and its standards 125 secured to post 124 and block 127 is so timed by means of drum 140 and shaft 139 that the front wall 118 is fully extended so as to receive the plunger 82 with its cookies 80 and 81 and liner 71 when said plunger 82 approaches the opened end of the bag.

When the vacuum cup 121 is released from its retaining grasp on the front wall 118, the plunger 82 has advanced to the position that the liner 71 adjacent to said plunger 82 touches the shoulders 142 of members 91 (Fig. 14) and further downward movement of plunger 82 forces the channel elements 90 to hold the bag 117 in place in co-action with pressure applied to the opened bag end walls by pressure arms 94. In other words, after the bag is opened by the vacuum, the said opened bag is retained from falling by mechanical pressure applied by the channel members 90 and the pressure arms 94 as shown in Fig. 16. The open bag and its inserted liner with the cookies in spaced relationship (Fig. 15) then falls by gravity upon a conveyor belt 143 and is moved into a bin 144. The conveyor belt 143 is provided with a strike plate 145 upon which the falling assembled package strikes prior to falling upon the conveyor belt proper.

Having described my invention, what I claim and desire to secure by Letters Patent is as follows:

1. In apparatus for forming a composite carton consisting of a bag, a U-shaped tape liner, and a pair of spaced-apart edible wafers or crackers, said apparatus comprising means for intermittently pulling a continuous strip or tape, means for cutting the said tape, means for crimping the cut tape, means for severing the cut and crimped tape, plunger means for transporting spaced apart cookies upon said cut and crimped liner, the improvement which consists in means for feeding successive open top bags beneath said plunger means, means for initial opening of said folded bags, mechanical finger means adapted to engage the opposed inner walls of said successive bags and thereby to complete the bag opening so that the liner and spaced apart cookies are deposited in said open bag in spaced-apart relationship, upon downward movement of said plunger, and means for operating said plunger means and said mechanical finger means in synchronism.

2. In apparatus for forming a composite carton consisting of a bag, a U-shaped tape liner, and a pair of cookies held in spaced apart relation by said liner, the improvement which consists in means for bagging the cookies and liner comprising a stack holder for successive open top folded bags, a vertically reciprocable plunger for moving the pair of cookies in its liner toward and into successive bags, vacuum means intermittently swingable to engage a flat surface of each of the successive folded bags, mechanism for applying and releasing the vacuum grip on said bags a pair of bag engaging mechanical fingers depressed by the descending plunger, said mechanical fingers being suspended by a plurality of movable lever arms and means for reciprocating said plunger.

3. The apparatus of claim 2 in combination with spring pressured bars for engaging the bag walls outwardly of said mechanical fingers after the vacuum means has released its vacuum grip upon the flat bag wall.

4. The apparatus of claim 2 in combination with means acting upon the vacuum means to intermittently swing it into engagement with a wall of each of successive bags preceding the downward movement of said plunger, and said vacuum means swinging means comprising a swingable block to which the vacuum means is adjustably connected.

References Cited in the file of this patent

UNITED STATES PATENTS

| | | |
|---|---|---|
| 1,161,581 | Anderson | Nov. 23, 1915 |
| 1,459,880 | Enright | June 26, 1923 |
| 1,518,081 | Lazaga | Dec. 2, 1924 |
| 2,051,483 | Jones | Aug. 18, 1936 |
| 2,521,403 | Overland | Sept. 5, 1950 |
| 2,528,997 | Blanchard | Nov. 7, 1950 |
| 2,616,233 | Schenk | Nov. 4, 1952 |
| 2,639,677 | Anderson | May 26, 1953 |